United States Patent
Bernard et al.

(10) Patent No.: US 6,254,660 B1
(45) Date of Patent: Jul. 3, 2001

(54) CORROSION-RESISTANT ALLOY, PREPARATION PROCESS AND ARTICLE MADE FROM THE ALLOY

(75) Inventors: Jean-Luc Bernard, Giencourt Breuil le Vert; Michel Bousquet, Chalon sur Saone; Olivier Kessler, Nancy; Pierre Steinmetz, Vandoeuvre, all of (FR)

(73) Assignee: Saint-Gobain Recherche, Aubervilliers Cedex (FR)

( * ) Notice: Subject to any disclaimer, the term of this patent is extended or adjusted under 35 U.S.C. 154(b) by 0 days.

(21) Appl. No.: 09/200,151

(22) Filed: Nov. 25, 1998

Related U.S. Application Data
(60) Provisional application No. 60/066,862, filed on Nov. 28, 1997.

(51) Int. Cl.$^7$ ..................................................... B22F 1/00
(52) U.S. Cl. ................................. 75/252; 75/232; 75/234; 75/235; 419/10; 419/32; 419/48
(58) Field of Search ............................. 75/232, 235, 234, 75/252; 419/10, 32, 48

(56) References Cited

U.S. PATENT DOCUMENTS

| | | | |
|---|---|---|---|
| 3,179,515 | * | 4/1965 | Grant et al. . |
| 3,990,860 | * | 11/1976 | Fletcher et al. . |
| 4,631,082 | * | 12/1986 | Andrews et al. .................... 75/235 |
| 5,089,354 | * | 2/1992 | Nakashima et al. ................ 428/552 |
| 5,397,373 | * | 3/1995 | Tomioka et al. ...................... 75/232 |
| 5,590,392 | * | 12/1996 | Ishiwata et al. .................... 428/546 |
| 5,866,518 | * | 2/1999 | Dellacorte et al. . |

* cited by examiner

*Primary Examiner*—Ngoclan Mai
(74) *Attorney, Agent, or Firm*—Oblon, Spivak, McClelland, Maier & Neustadt, P.C.

(57) ABSTRACT

The invention relates to a $Cr_2O_3$-forming alloy that is resistant to oxidization and/or corrosion at high temperature, especially by glass, characterized in that it contains, in dispersion within its matrix, chromium oxide $Cr_2O_3$, or a precursor of this oxide. This alloy can be prepared by powder metallurgy using a process of hot consolidation of metallic powders, in particular by sintering. The alloy is especially suitable for articles which are to be used in a high-temperature oxidizing or corrosive environment.

65 Claims, 2 Drawing Sheets

CORROSION-RESISTANT ALLOY, PREPARATION PROCESS AND ARTICLE MADE FROM THE ALLOY

This application claims priority of provisional application Serial No. 60/066,862 Filed Nov. 28, 1997.

BACKGROUND OF THE INVENTION

Field of the Invention

The present invention relates to an alloy that is resistant to oxidation and/or corrosion, in particular at high temperature. More particularly, the invention relates to an alloy resistant to oxidation in a corrosive environment, such as molten glass or another similar material, which can be used to make articles which are brought into contact with molten glass or similar material when it is being prepared or hot converted.

2. Discussion of the Background

In the glass industry, the elements or tools in contact with the molten glass are made of refractory materials, in particular ceramics. For certain operations, it is preferable to use metal tools, generally made of alloy, in particular when the tool needs to have electrical conduction properties or when the tool needs to have a certain ductility and mechanical strength at the temperature at which the molten glass is processed.

This is the case, for example, for the manufacture of glass wool by the technique referred to as internal centrifugation, more particularly as regards the final phase of the process in which, on leaving the melting furnace, the glass is cast continuously in a set of axisymmetric elements rotating at a very high rotational speed about their vertical axis. Stopped in its initial fall by the bottom of an internal part, or "basket", the glass spreads under the effect of the centrifugal force against the cylindrical wall of the same part, this wall being pierced by holes. These holes allow the glass to pass through and, still under the effect of the centrifugal force, it becomes pressed against the wall, or "band", of an external part, or "spinner", which is also pierced with holes, these holes being smaller than the previous ones. Still under the effect of the centrifugal force, the glass passes through the band of the spinner from all sides in the form of molten glass filaments. An annular burner located above the outside of the spinner, producing a downward gas stream running along the outer wall of the band, deflects these filaments downward while stretching them. They then "solidify" in the form of glass wool.

The parts referred to as "basket" and "spinner" are fiber processing tools subjected to very high degrees of stress thermally (thermal shocks when starting and stopping), mechanically (centrifugal force, erosion due to the transit of the glass) and chemically (oxidation and corrosion by the molten glass, and by the hot gases leaving the burner, in the case of the spinner). Typically, the operating temperature is on the order of at least 1000° C., so that the glass has a suitable viscosity.

The life of these components generally depends on the corrosion resistance of the material of which they are made. In this regard, use is generally made of a nickel-based alloy containing about 30% chromium and reinforced by carbide precipitation, as described especially in FR-A-2 536 385.

The oxidation and corrosion resistance of this alloy at the temperature at which it is used is ensured by its high proportion of chromium, which forms a protective layer of chromia (chromium oxide, $Cr_2O_3$) at the surface of the part in contact with the oxidizing environment. Continuous diffusion of chromium toward the corrosion front makes it possible to keep a chromium reserve behind the layer of oxides, e.g., $Cr_2O_3$.

The working temperatures at which this alloy can be used successfully are, however, limited to a maximum value of the order of 1050 to 1100° C. Above this temperature, the material is rapidly degraded by corrosion as well as by creeping. This material is therefore incapable of meeting the demand of techniques by which wool is produced from glasses that are more viscous than the customary glasses of the borosilicate type and whose use requires temperatures in excess of 1100° C.

In order to meet this need, one object of the present invention is to provide an alloy having improved resistance to corrosion, and more particularly to oxidation at high temperature, and in particular up to temperatures of the order of 1300° C.

Certain alloys based on metals more refractory than nickel are known to have good resistance to corrosion by glass at elevated temperature. Mention may in particular be made of a cobalt-based alloy according to FR-A-2 273 075.

Other special alloys, such as alloys reinforced by oxide dispersion (ODS), superalloys in general based on nickel and/or iron containing, in dispersion within their matrix, fine particles of oxides, and generally yttrium oxide, have also been used to make fiber processing spinners having good mechanical properties at elevated temperature. An alloy of this type is described, in particular, in U.S. Pat. No. 5,328,499.

It is, however, difficult with known alloys to achieve temperatures in excess of 1200–1250° C. while having an oxidation strength compatible with industrial production requirements.

As an alternative, it is known to use highly refractory metals, such as molybdenum or tungsten, which are endowed with high resistance to corrosion by glass at high temperature when they are fully immersed in the glass. The problem that these refractory metals have in common is still, however, their sensitivity to atmospheres containing oxygen. This is because their reactivity is actually very high and leads to the formation of oxides which are either poor protectors, as in the case of tantalum or niobium, or are highly volatile, as in the case of molybdenum and tungsten, and responsible for rapid degradation by corrosion at high temperature.

Accordingly, another object of the present invention is to improve the oxidation and/or corrosion strength of a metal or metal alloy at high temperature.

SUMMARY OF THE INVENTION

One object of the present invention is to provide an alloy having improved resistance to corrosion, and more particularly to oxidation at high temperatures, and particularly temperatures up to 1300° C.

Another object of the present invention is to improve the oxidation and/or corrosion strength of a metal or metal alloy at high temperature.

These and other objects have been achieved in the present invention by creating a dispersed phase of chromium oxide $Cr_2O_3$ (chromia) particles in the matrix of the material. It has been observed that the presence of $Cr_2O_3$ actually inside the material promotes the formation, and above all the maintenance, of a protective chromia layer at the surface of the material. The dispersed phase of chromium oxide $Cr_2O_3$ may either result from a dispersion of $Cr_2O_3$ introduced in this form into the material, or from an in situ reaction starting with a suitable precursor dispersed in the matrix and capable of reacting in and possibly with the matrix to form internal $Cr_2O_3$.

Accordinly, one embodiment of the invention relates to a $Cr_2O_3$-forming alloy, wherein the alloy includes:

a matrix; and, dispersed within said matrix, particles selected from the group consisting of $Cr_2O_3$, and a $Cr_2O_3$ precursor, and mixtures thereof Another embodiment of the invention relates to a process for preparing the $Cr_2O_3$-forming alloy that includes:

one or more steps of hot consolidation of metallic powders selected from the group consisting of sintering, pressing, forging or welding.

Another embodiment of the invention relates to an article that includes the $Cr_2O_3$-forming alloy.

Another embodiment of the invention relates to a method of improving the oxidation and/or corrosion strength of a metal or metal alloy, and particularly the high temperature oxidation and/or corrosion strength thereof, which includes dispersing particles selected from the group consisting of $Cr_2O_3$, and a $Cr_2O_3$ precursor, and mixtures thereof into the metal or metal alloy.

In this regard, the invention relates to a chromia-forming alloy that is resistant to oxidization and/or corrosion, especially by glass, in particular at high temperature, characterized in that it contains, in dispersion within its matrix, chromium oxide $Cr_2O_3$ and/or at least one precursor of this oxide.

DESCRIPTION OF THE PREFERRED EMBODIMENTS

Various other features, objects and attendant advantages of the present invention will be more fully appreciated as the same becomes better understood from the following detailed description, which is not intended to be limiting unless otherwise specified.

In the present description, the term alloy is preferably used in the conventional way to denote a metallic product obtained by incorporating one or more other elements in a metal. As applied to the invention, this definition preferably encompasses both materials whose matrix includes the combination of chromium alloyed with at least one other metal, and materials whose matrix consists of pure chromium, the alloy constituent being in the latter case chromium oxide $Cr_2O_3$ and/or its particular precursor.

The term "chromia-forming" or "$Cr_2O_3$-forming" preferably means an alloy which, in the presence of an oxidizing or corrosive environment, such as oxygen in air or molten glass, can form a protective layer of chromia (chromium oxide $Cr_2O_3$) at its surface.

According to the invention, this capacity is improved by the presence of particles of chromia $Cr_2O_3$ and/or at least one precursor of $Cr_2O_3$ in internal dispersion.

The term "precursor of $Cr_2O_3$ oxide" preferably means any compound which, in the environment of the matrix, can react to form chromium oxide $Cr_2O_3$, where appropriate by means of a suitable treatment, in particular a heat treatment. Preferably, a precursor of this type is an oxygenated compound of a metal which can be reduced by the neighboring chromium atoms within the matrix. Suitable oxygenated compounds are oxides of metals more oxidizing than chromium, such as especially iron, nickel, cobalt, for example $Fe_2O_3$, FeO, NiO, CoO. Preferably, the chromia precursor may be mixed oxides of chromium and another metal, such as in particular chromites of iron, nickel or cobalt.

Depending on the reaction kinetics of the said precursor compound, the alloy may contain, as dispersoid, over periods lasting a variable amount of time, either the precursor or both chromia and its precursor, or chromia.

Preferably, particles in internal dispersion, namely the particles of $Cr_2O_3$ and/or precursor(s) occupy at least 0.1%, especially at least 0.5%, in particular at least 1% of the volume of the alloy. Preferably, the proportion is in general at most 10% by volume, especially at most 5% by volume. The proportion of $Cr_2O_3$ by volume is most preferably of the order of from 1 to 10%, in particular from 1 to 5%. Preferably, the proportion of dispersed chromia particles is of the order of from 2 to 3%.

The internal chromium oxide particles are preferably distributed in the matrix in the form of a nanometric to micrometric dispersion, that is to say the particles preferably have a size of the order of from 1 nanometer to about 10 microns, in particular from 1 nm to 10 μm, in particular from 0.1 to 5 μm.

Preferably, the alloy owes its $Cr_2O_3$-forming character to a matrix which contains chromium in a proportion of at least 10% by weight, especially at least 15% by weight, in particular at least 20% by weight of the alloy.

While high proportions of chromium are not in general recommended in the prior art, because of the paradoxically high rate at which pure chromium is oxidized, the internal dispersion of $Cr_2O_3$ oxide in the alloys according to the invention also has an advantageous effect in the case of chromium-rich alloys, the wear of which in an oxidizing environment is found to be less rapid.

In a particular preferred embodiment of the invention, the alloy matrix is composed of chromium or comprises chromium in combination with at least one other refractory metal such as, especially, molybdenum, tungsten, niobium or tantalum.

The very good high temperature stability of these refractory metals, which all have melting points in excess of 1700° C., makes them advantageous for the production of tools subjected to a very high temperature, in particular to 1300° C.

In this regard, preference may be given to matrices based on molybdenum and chromium; based on molybdenum, chromium and tungsten; or based on tungsten and chromium.

Chromium, as a base element or as an alloy element, provides the material with the ductility needed according to the stresses which the tool undergoes during service. It also acts as a chromium reserve for the formation of the surface chromia layer.

In general, the proportions of the constituent elements of the alloy may be chosen in a manner which is known per se, in particular on the basis of the corresponding phase diagrams, especially to mechanical properties of the material.

By the way of nonlimiting illustration mention may be made of the following preferred matrices:

molybdenum-chromium containing from 15 to 50% by weight of chromium and from 50 to 85% by weight of molybdenum;

tungsten-chromium containing from 20 to 99% by weight of chromium and from 1 to 80% by weight of tungsten.

As a more preferred matrix, mention may be made of molybdenum-tungsten-chromium matrices containing:
  from 10 to 60% by weight of Cr
    advantageously from 20 to 40% by weight of Cr, from 10 to 50% by weight of Mo
    advantageously from 10 to 50% by weight of Mo, especially from 20 to 40% by weight of Mo, from 10 to 70% by weight of W
    advantageously from 10 to 50% by weight of W, especially from 20 to 40% by weight of W.

In particularly preferred matrices, the weight ratio of molybdenum to tungsten is in favor of tungsten, especially of the order of from 0.3 to 0.6.

The above refractory metal alloys are preferably prepared by sintering, and in this regard may further comprise a sintering agent such as palladium or another platinoid, advantageously in a proportion of 0.1 to 3% by weight of the alloy. Other platinum metals or platinum group metals may also be used.

It is in general preferable for the proportion of palladium not to be too high with regard to the proportion of chromium, so as to avoid the appearance of an intergranular phase of Pdα saturated with Cr in solid solution, which by its low melting point tends to reduce the mechanical properties of the alloy at high temperature.

A range of referred refractory alloy compositions is as follows:

| | |
|---|---|
| Cr | 15 to 42% |
| W | 25 to 50% |
| Mo | 12 to 35% |
| Pd | 0.5 to 1% |

Residual impurities <0.5%

A preferred refractory alloy composition is especially as follows:

| | |
|---|---|
| Cr | 34 to 40% |
| W | 27 to 35% |
| Mo | 27 to 35% |
| Pd | 0.5 to 1% | residual impurities <0.5%.

Another preferred refractory alloy composition is especially as follows:

| | |
|---|---|
| Cr | 34 to 42% |
| W | 33 to 47% |
| Mo | 12 to 24% |
| Pd | 0.5 to 1% | residual impurities <0.5%.

The improvement in the oxidation strength is not, however, limited just to the refractory alloys mentioned above, but also concerns other alloys comprising chromium. Thus, in another preferred embodiment of the invention, the matrix is based on iron, nickel and/or cobalt, in combination with chromium. Mention may preferably be made of matrices based on nickel-chromium, cobalt-chromium, nickel-cobalt-chromium, nickel-iron-chromium, cobalt-iron-chromium and cobalt-nickel-iron-chromium, in which the proportion of these elements is preferably chosen in the following ranges (in % by weight):

| | |
|---|---|
| Cr | 10 to 40% |
| Ni | 10 to 80% |
| Co | 10 to 80% |
| Fe | 0 to 40% |

Mention may, for example, be made of nickel-chromium matrices with about 20 to 30% by weight of Cr, iron-chromium matrices with about 15 to 25% by weight of Cr, or cobalt-chromium matrices with about 25 to 35% by weight of Cr.

Matrices of the ODS type may also be envisaged, preferably based on nickel-chromium or nickel-chromium-cobalt, which are reinforced by oxide dispersion. The oxide in dispersion may be chosen, in particular, from the oxides of yttrium, zirconium, lanthanum, cerium, hafnium, thorium and other elements capable of forming stable oxides, which do not oxidize the metal or metals in the matrix. In this type of alloy, with the combined presence of dispersoids of chromium oxide and at least one oxide of an active element above, the material can at the same time be provided with excellent mechanical properties at high temperature and improved resistance to corrosion and/or oxidation.

With all the chromia-forming alloys which were studied, the internal $Cr_2O_3$ oxide dispersion is believed to lead to better anchoring of the protective $Cr_2O_3$ layer at the surface of the material in contact with the oxidizing or corrosive atmosphere. The "mechanical" stability of the oxide layer obtained in this way is a contributory factor to improving the oxidation resistance, since it reduces the risk of the material being stripped bare by erosion.

Further, even under particularly severe conditions in which the material undergoes very strong mechanical stresses, leading to local failure of the oxide layer by tearing (cracking) or erosion, it has been observed that the alloys according to the invention have a remarkable facility for rapidly reforming the chromia layer wherever it has been degraded.

It is also believed that the presence of internal chromium oxide promotes the creation of a more compact and denser chromia surface layer, in which the diffusion of the reactive species is slowed. This seems to be the case with oxygen, since the oxidation rate of the alloys with internal $Cr_2O_3$ according to the invention is slower than those of alloys which are similar but do not comprise internal $Cr_2O_3$. An improvement of the same type is also observed with respect to nitriding.

In general, it may be stated that the presence of particles of chromium oxide $Cr_2O_3$ or of precursors promotes the maintaining of effective protection against oxidation or other types of corrosion.

The invention also relates to a process for preparing an alloy as described above, characterized in that it comprises one or more steps of hot consolidation of metallic powders, in particular sintering, pressing, (for example uniaxial or isostatic pressing), forging or hot welding (for example extrusion or rolling). These different types of consolidation may be complementary.

In the case of sintering, free sintering may be envisaged, as may sintering under load, using the techniques of hot uniaxial pressing or hot isostatic pressing.

The elements constituting the matrix of the alloy, individually in powder form, are mixed to obtain a particulate material of homogeneous composition, in a preliminary step, of the grinding type, in which the metallic powders are mixed.

In particular according to the initial particle size distribution of the powders, this operation may be carried out using traditional grinding means or more powerful ones.

In certain cases, the process may thus comprise a preliminary mechanical alloying step. This powder grinding technique, using a grinding material generally in the form of beads, makes it possible to reduce the particle size distribution of the powders, and this may, optionally, be accompanied by a chemical reaction. This may, in particular, involve an alloying synthesis, starting with elementary metallic powders, to form intermetallic compounds or solid solutions, or alternatively redox reactions between the powders.

This technique is advantageous, in particular, for the dispersion of a fragile phase in a metallic matrix; this is the case with the manufacture of ODS alloys.

There are several available possibilities for introducing the $Cr_2O_3$ oxide particles into the material, and these may be employed as alternatives or in combination:

adding chromium oxide in divided form to the mixture of metallic powders;

forming oxide particles in situ from metallic chromium in divided form, by exposing the chromium to an oxidizing atmosphere. In this case, the oxidization of the chromium is preferably carried out before or during the mixing of the metallic powders;

adding a chromium oxide precursor, in particular an oxygenated compound of a metal which can be reduced by chromium, such as an oxide, in divided form to the mixture of metallic powders.

Preferably, the hot consolidation step is carried out under vacuum or under an inert atmosphere, in order to prevent undesirable contamination. In the presence of elements such as chromium which have a high vapor pressure, it is preferable to operate under inert gas pressure, in particular of the order of at least $5 \times 10^{-5}$ Pa, rather than under vacuum, at least during some of the pressing. Argon, for example, may be used as an inert gas.

The consolidation temperature depends naturally on the composition of the matrix of the alloy, as well as any load which may be applied. These parameters can be chosen with ease in a manner known per se by the person skilled in the art.

As indicated above, the alloys according to the invention make it possible to manufacture articles that can be used in an oxidizing or corrosive environment at high temperature. In this regard, the invention further relates to an article, in particular for the preparation and/or hot conversion of glass, made of an alloy as has just been described.

Among other applications, an article of this type may in particular be a fiber processing spinner for the manufacture of glass wool, a die element for the manufacture of textile glass fiber, a crucible for melting vitrifiable material, a component for stirring molten glass, an element or support for a probe immersed in molten glass, a melting electrode, etc.

In general, the alloy according to the invention can be used to manufacture furnace outlet dies or feeders for the production of materials from a vitrifiable composition. This may, as mentioned above, involve the production of so-called textile glass fibers used for reinforcing, as well as the production of mineral fibers such as glass fibers or rock fibers which are customarily used for thermal or acoustic insulation.

This also comprises the packaging glass referred to as hollow ware such as flasks and bottles.

Outside the glass industry, the alloys according to the invention may be applied to the manufacture of a wide variety of articles, when they need to have a high degree of resistance in an oxidizing and/or corrosive environment, in particular at high temperature, for example for producing heat treatment furnace parts, electrical heating resistors, or alternatively in aviation for turbine elements.

In general, these alloys can be used to produce any type of refractory alloy parts used for the operation or running of a heat treatment furnace at high temperature (in excess of 1100° C.). They may thus, for example, be hot fan blades, heating supports, feed equipment, etc. They can also be used to produce any kind of heating resistor intended to operate in a hot oxidizing atmosphere, and to make turbine elements forming part of engines for land, sea or air vehicles, or in any other application not relating to vehicles, for example in power stations.

BRIEF DESCRIPTION OF THE DRAWINGS

A more complete appreciation of the invention and many of the attendant advantages thereof will be readily obtained as the same becomes better understood by reference to the detailed description when considered in connection with the accompanying drawings, wherein.

EXAMPLES

Figure 1:
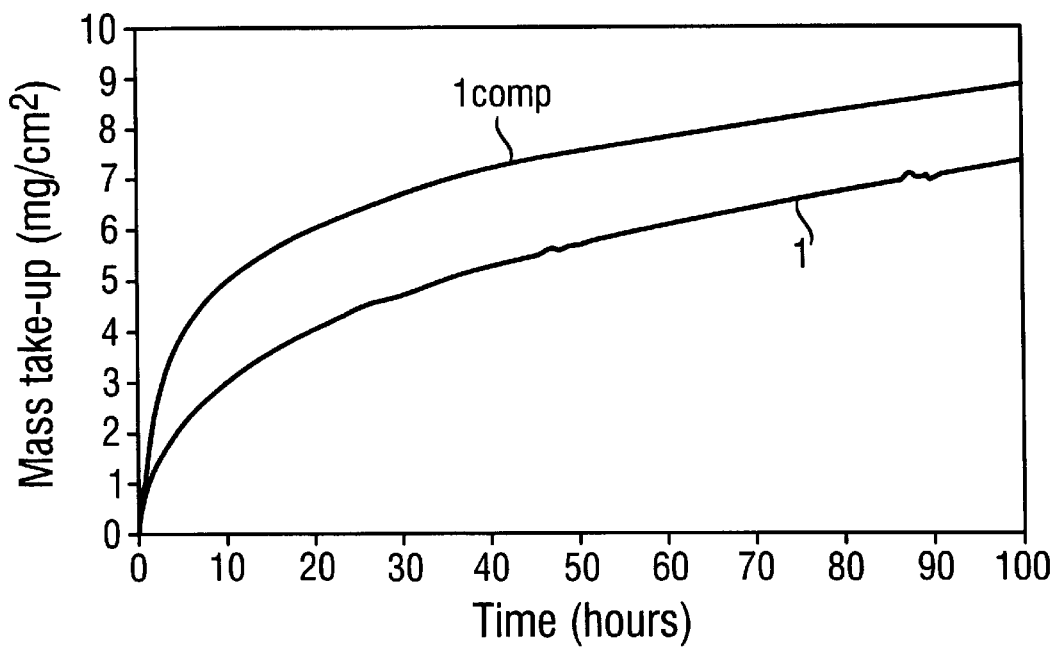
FIG. 1 compares the isothermal oxidation properties of a first alloy according to the invention and a comparative alloy, not containing chromium oxide in internal dispersion.

Having now generally described the invention, a further understanding can be obtained by reference to certain specific examples, which are provided herein for purposes of illustration only and are not intended to be limiting unless otherwise specified.

Example 1

An alloy based on chromium-molybdenum-tungsten according to the invention is prepared by modifying a Cr-Mo-W matrix of the following composition (in % by weight):

| | |
|---|---|
| Cr | 24% |
| Mo | 37.5% |
| W | 37.5% |
| Pd | 1% | by adding $Cr_2O_3$, particles in a proportion of about 5% by volume.

The composition by weight of the alloy is as follows (in % by weight):

| | |
|---|---|
| Cr | 23.4% |
| Mo | 36.6% |
| W | 36.6% |

-continued

| Pd | 1.0% |
|---|---|
| $Cr_2O_3$ | 2.4% |

Molybdenum, in the form of a powder with particle size 2–4 μm, and tungsten in the form of a powder with particle size 1–2 μm, are firstly annealed under hydrogen for 1 hour at 900° C. to reduce the oxide at the surface of the metallic grains. They are then mixed with chromium in the form of a powder particle size 1 μm, palladium with particle size 1–1.5 μm and finely divided chromium oxide, and ground at length in an agate mortar to obtain a mixture of homogeneous composition with a fine and uniform distribution of the chromine particles.

Lastly, the powders are sintered under load by hot uniaxial pressing in a LILLIPUT brand press furnace from the company ECM, comprising a graphite heating element, a hydraulic unit which makes it possible to impose a maximum load of 10,000 daN at the center of the furnace by means of a piston, as well as a primary vacuum station and a feed station for inert gas (argon).

The mixture of powders is firstly compacted into a 15 mm diameter pellet in the graphite cavity mold, by compressing the powder at ambient temperature under a load of about 100 kg.

This is followed by the sintering proper, under the following conditions:
  rise in temperature at low rate (10 to 15° C./min) and in steps up to 1200° C. under dynamic primary vacuum and under 5 MPa load;
  then setting up an argon flow and continuing the temperature rise at low rate, with a long hold (about 60 min) at 1370° C. under a load of 27 MPa and another long hold (about 120 min) at 1420° C., still under a load of 27 MPa;
  temperature jump from 1420° C. to ambient temperature under zero load and argon flow.

After sintering, annealing may be carried out, on the one hand to reduce the residual stresses which may have arisen during the cooling, and on the other hand to improve the homogeneity of the alloy, if need be. Advantageous annealing conditions are as follows:
  temperature rise to 1370° C., then hold for 2 h at 1370° C. under hydrogen flow;
  then rise to 1420° C. and hold for 24 h at 1420° C. under argon flow;
  cooling to ambient temperature.

The alloy obtained is observed under optical microscopy, scanning electron microscopy (SEM) and Castaing probe microanalysis, using the customary techniques.

The result of the synthesis is a homogeneous alloy with a grain size of the order of 50 μm. The grains of chromia $Cr_2O_3$, a few microns wide, were distributed uniformly at the grain boundaries in the alloy. It is verified that the volume occupied by the $Cr_2O_3$ grains represents about 5% of the volume of the alloy.

The properties of the alloy in terms of oxidation at high temperature are evaluated by thermogravimetry, in which the mass take-up of an alloy sample (indicative of the amount of oxide which is formed) is measured as a function of time in a chamber heated to 1300° C.

The general conditions are as follows:
  rise with isothermal holding in steps of 10° C./min;
  duration of the isothermal hold for 100 hours at 1300° C.;
  reduction to ambient temperature at 10° C./min; with the furnace being flushed with a 1.5 L/h flow of dry synthetic air.

The results are represented on the graph in FIG. 1, in terms of mass take-up (in mg/cm²) per unit time (in hours).

Comparative Example 1

An alloy having the same matrix as the alloy in example 1 was prepared, but without adding chromium oxide to the elementary metal powders, Its composition by weight is therefore as follows:

| Cr | 24% |
|---|---|
| Mo | 37.5% |
| W | 37.5% |
| Pd | 1% |

The preparation conditions are the same as in example 1, and its oxidation properties are also represented in FIG. 1.

FIG. 1 shows that the mass take-up of the alloy in example 1 (curve 1) is less than that of the comparative alloy without addition of chromia (curve 1 comp.), and therefore that the addition of internal $Cr_2O_3$ improves the resistance to oxidation.

Example 2

In a similar way to example 1, an alloy based on chromium-molybdenum-tungsten according to the invention is prepared, having a higher proportion of chromium. Its composition by weight is as follows:

| Cr | 37.9% |
|---|---|
| Mo | 29.2% |
| W | 29.2% |
| Pd | 1.0% |
| $Cr_2O_3$ | 2.7% |

The preparation conditions are the same as in example 1. They may optionally comprise a preliminary mechanical alloying step: after the molybdenum and tungsten have been annealed under hydrogen, the metallic powders are introduced into a vessel containing tempered steel balls, under a dehumidified argon atmosphere. The hermetically closed vessel is then mounted on a planetary grinder and the powders are ground in 3 sequences of one hour, with a quarter of an hour between them in order to avoid excessive heating.

The result of the synthesis is an alloy whose grain size is of the order of 15 to 20 μm, with chromium oxide grains dispersed uniformly at the grain boundaries and occupying about 5% of the volume of the alloy.

Figure 2:
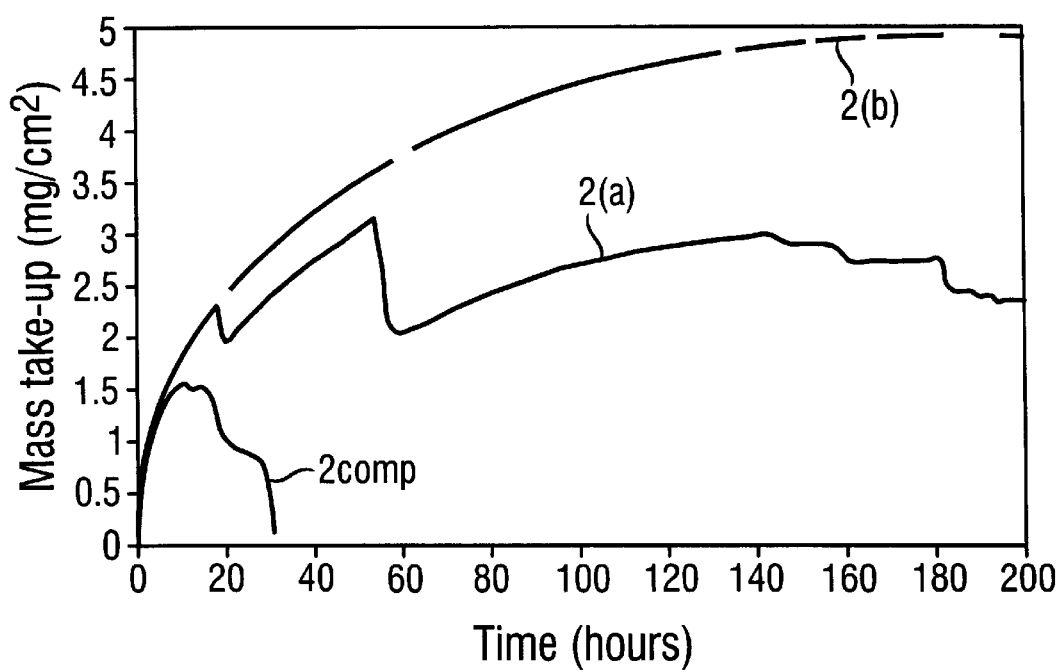
FIG. 2 compares the isothermal oxidation properties of a second alloy according to the invention and a comparative alloy, not containing chromium oxide in internal dispersion.

As in example 1, this alloy is characterized by thermogravimetry at 1300° C. The thermogram (curve 2a) represented in FIG. 2 shows that the oxidation kinetics are disrupted by sequences of rapid mass loss, followed by a resumption of the normal kinetic behavior in a relatively short time (with the exception of these interruptions—curve 2b—the kinetic behavior is of the same type as in example 1).

The rapid mass losses seem to be due to local breaks in the oxide layer, principally at the edges of the oxidized wafer. The resumptions of normal behavior suggest that the alloy is capable of healing its own surface chromium oxide layer when deficiencies arise in it.

The alloy in example 2 is in fact highly resistant, because it resists oxidation at 1300° C. for 325 h.

Comparative Example 2

An alloy having the same matrix as the alloy in example 2 was prepared, but without adding chromium oxide to the elementary metal powders.

Its composition by weight is therefore as follows:

| | |
|---|---|
| Cr | 39% |
| Mo | 30% |
| W | 30% |
| Pd | 1% |

The oxidation properties of this comparative alloy are also represented in the form of a thermogram (curve 2 comp.) in FIG. 2.

The comparative alloy 2 has very different oxidation behavior than the alloy in example 2: it starts by oxidizing with a moderate mass take-up, representing a limited formation of the protective chromia surface layer, then the mass take-up falls abruptly, indicating an irrecoverable break in this surface layer and total degradation of the material.

It would seem in particular that the surface oxide layer of the comparative alloy is very highly stressed and therefore cracks, losing its impermeability to nitrogen. The nitriding of the exposed chromium would accelerate the corrosion of the alloy, which rapidly becomes complete.

The presence of chromium oxide particles in internal dispersion in the alloy 2 makes it possible to remedy this problem, and allows the material to resist oxidation by surface formation of a durable protective layer of $Cr_2O_3$.

Examples 3 to 6

These examples still pertain to alloys based on chromium-molybdenum-tungsten, wherein the weight ratio moblydenum/tungsten now is in favor of tungsten.

The preparation conditions are substantially the same as in Example 1, except that the final annealing step is:
- suppressed in Examples 3 and 5,
- carried out in Examples 4 and 6 with a temperature of 1600° C. held for 24 h.

The essential characteristics of these alloys are indicated in the following table.

| | COMPOSITION (% by weight) | Mo/W | Annealing |
|---|---|---|---|
| EX. 3 | Cr 38.5% <br> Mo 19.8% <br> W 39.5% <br> Pd 1% <br> $Cr_2O_3$ 1.2% [2.5% by volume] | 0.5 | no |
| EX. 4 | $Cr_{38.5}Mo_{19.8}W_{39.5}Pd_1(Cr_2O_3)_{1.2}$ | 0.5 | 24 h at 1600° C. |
| EX. 5 | Cr 38.5% <br> Mo 14.2% <br> W 44.4% <br> Pd 1% <br> $Cr_2O_3$ 1.2% [2.5% by volume] | 0.33 | no |
| EX. 6 | $Cr_{38.5}Mo_{14.2}W_{44.4}Pd_1(Cr_2O_3)_{1.2}$ | 0.33 | 24 h at 1600° C. |

Figure 3:
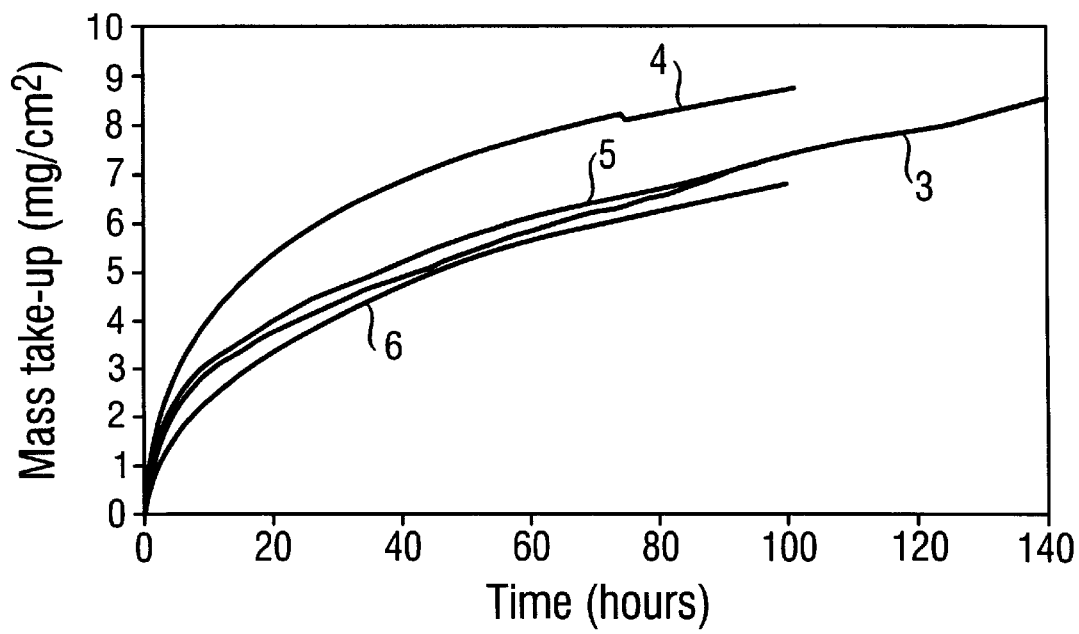
FIG. 3 shows the isothermal oxidation properties of four other alloys according to the invention.

The results of thermogravimetric tests represented on FIG. 3 (curves 3, 4, 5 and 6 being the thermograms of the alloys of Examples 3, 4, 5 and 6 respectively) show that these four alloys are perfectly resistant to oxidation for at least 100 hours at 1300° C.; the resistance may very easily exceed 150 hours.

Example 7

An alloy based on nickel-chromium according to the invention is prepared by modifying an Ni—Cr matrix of the following composition (in % by weight):

| | |
|---|---|
| Ni | 70% |
| Cr | 30% | by adding $Cr_2O_3$ particles in a proportion of about 5% by volume.

The composition by weight of the alloy is as follows (in % by weight):

| | |
|---|---|
| Ni | 67.8% |
| Cr | 29.0% |
| $Cr_2O_3$ | 3.2% |

The metals, in powder form, are mixed with the finely divided chromium oxide, and ground at length in an agate mortar to obtain a mixture of homogeneous composition with a fine and uniform distribution of the chromine particles.

The powders are then sintered under load by hot uniaxial pressing, in the press furnace in example 1, of a 15 mm diameter powder pellet compressed at ambient temperature under a load of about 100 kg.

The sintering proper is carried out with a long hold (about 60 min) at 1000° C. under a load of 27 MPa, and another long hold (about 120 min) at 1100° C., still under a load of 27 MPa.

As in the previous examples, microscopy is used to check that the alloy which is obtained is homogeneous and that the chromia $Cr_2O_3$ grains, a few microns wide, are distributed uniformly at the grain boundaries in the alloy. A check is made that the volume occupied by the $Cr_2O_3$ grains represents about 5% of the volume of the alloy.

Figure 4:
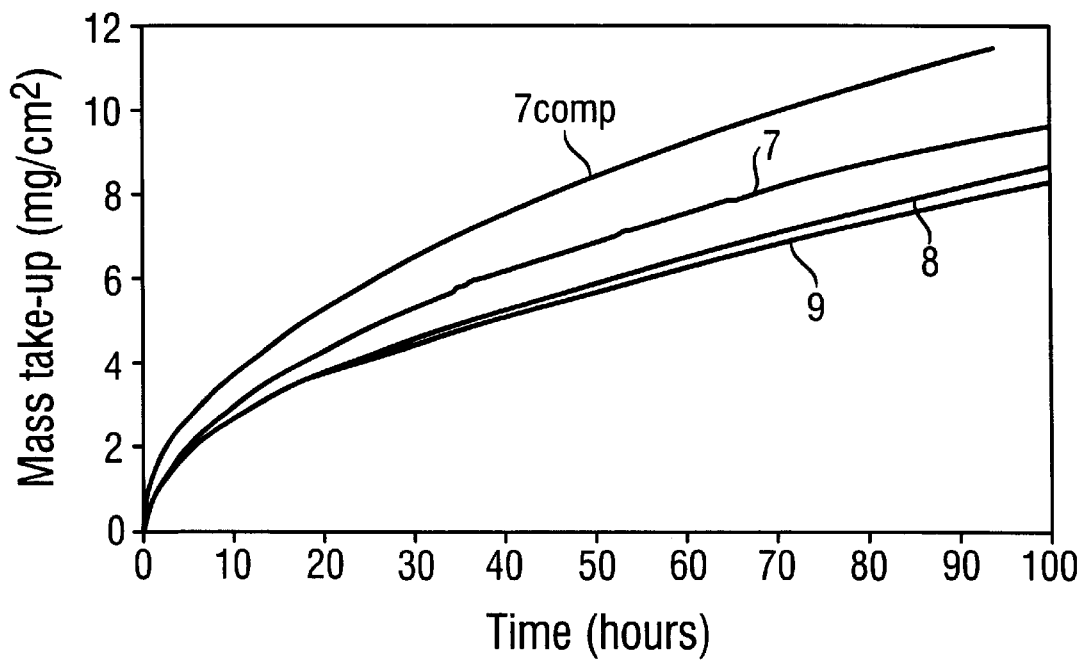
FIG. 4 compares the isothermal oxidation properties of three other alloys according to the invention and a comparative alloy, not containing chromium oxide in internal dispersion.

The properties of the alloy in terms of high temperature oxidation are evaluated by thermogravimetry at 1300° C. under the conditions described above, for about one hundred hours, and are graphically represented by the thermogram 7 in FIG. 4.

The constant $K_p$ of the parabolic oxidation kinetics is of the order of $2.6 \times 10^{-10} g^2 cm^{-4} s^{-1}$.

An observation of the oxidized material by scanning electron microscopy in back-scattered electron mode shows the presence of a very regular and perfectly compact surface layer of chromium oxide, with a thickness of about 50 μm, adhering to the alloy.

The properties of this alloy in the presence of a corrosive environment, consisting of molten glass, are characterized in an electrochemical test consisting in measuring the passivation potential of the alloy when immersed in a bath of molten glass at a temperature of 950° C. Measurements are taken using an arrangement with 3 electrodes: a working electrode made of alloy 7, a platinum counter-electrode and a zirconia reference electrode. The working electrode is a rotating electrode, making it possible to improve the replenishment of the glass around the electrode and to simulate the erosion exerted on the material when in service.

Under the conditions of the test, the current/potential curve for the alloy 7 exhibits a passivation peak for a potential of the order of −1.1 mV with a passivation current strength of about 5.0 mA/cm². The intensity of the passivation peak is indicative of the inverse of the capacity of the alloy for forming and maintaining its protective surface layer of chromia.

Comparative Example 7

Under the conditions in example 7, a comparative alloy 7 is prepared which does not include chromium oxide in internal dispersion. Its composition is that of the matrix used above, namely:

| | |
|---|---|
| Ni | 70% |
| Cr | 30% |

This alloy is subjected to them same thermogravimetry test at 1300° C., and its performance is illustrated by the thermogram 7 comp. in FIG. 4.

The mass take-up of the comparative alloy 7 is clearly greater than those of alloy 7 (in example 7), indicating inferior resistance to oxidation. The constant $K_p$ of the parabolic oxidation kinetics of comparative alloy 7 is of the order of $3.9 \times 10^{-1} g^{-2} cm^{-4} s^{-1}$.

Observation of the oxidized material by scanning electron microscopy shows structural differences of the surface $Cr_2O_3$ layer in comparison with that observed on alloy 7, the layer being less compact and exhibiting a substantial number of cracks.

The properties of this alloy, in the presence of a corrosive environment consisting of molten glass, are characterized by the electrochemical measurements described in example 7.

Under the same test conditions, the current/potential curve for comparative alloy 7 exhibits a passivation peak for the same potential, of the order of −1.1 mV, with a passivation current strength of about 6.3 mA/cm². The intensity of the passivation peak is indicative of the inverse of the capacity of the alloy for forming and maintaining its protective surface layer of chromia.

Example 8

Another alloy based on nickel-chromium according to the invention is prepared, as in example 7, by modifying the same Ni—Cr matrix through the addition of $Cr_2O_3$ particles in a proportion of about 1% by volume.

The composition by weight of the alloy is as follows (in % by weight):

| | |
|---|---|
| Ni | 69.5% |
| Cr | 29.8% |
| $Cr_2O_3$ | 0.6% |

The oxidation properties of alloy 8 are evaluated by thermogravimetry at 1300° C. under the same conditions, and are graphically represented by the thermogram 8 in FIG. 4.

Comparing the thermograms 7 and 8 shows that alloy 8 exhibits superior resistance to oxidation than alloy 7, the constant $K_p$ of the parabolic oxidation kinetics of alloy 8 being of the order of $2.0 \times 10^{-10} g^2 cm^{-4} s^{-1}$.

Example 9

Another alloy based on nickel-chromium according to the invention is prepared, as in example 7, by modifying the same Ni—Cr matrix through the addition of $Cr_2O_3$ particles in a proportion of above 2.5% by volume.

The composition by weight of the alloy is as follows (in % by weight):

| | |
|---|---|
| Ni | 68.9% |
| Cr | 29.5% |
| $Cr_2O_3$ | 1.6% |

The oxidation properties of alloy 9 are evaluated by thermogravimetry at 130° C. under the same conditions, and are graphically represented by the thermogram 9 in FIG. 4.

Comparing the thermograms 7, 8 and 9 shows that alloy 9 exhibits superior resistance to oxidation than alloys 7 and 8, evidencing an optimum for the internal chromia concentration at around 2.5% by volume. The constant $K_p$ of the parabolic oxidation kinetics of alloy 9 is of the order of $1.8 \times 10^{-10} g^2 cm^{-4} s^{-1}$.

Observing the oxidized material by scanning electron microscopy in back-scattered electron mode gives results similar to those in example 7, but with better adhesion of the oxide layer to the alloy.

Having now fully described the invention, it will be apparent to one of ordinary skill that, given the teachings herein, many changes and modifications can be made thereto without departing from the spirit or scope of the invention as set forth herein.

This application is based on U.S. Provisional Application No. 60/066,862, filed Nov. 28, 1997, the entire contents of which are hereby incorporated by reference.

What is claimed is:

1. A $Cr_2O_3$-forming alloy, comprising:
   a matrix; and,
   dispersed within said matrix, particles selected from the group consisting of a $Cr_2O_3$ precursor and mixtures of $Cr_2O_3$, and a $Cr_2O_3$ precursor; wherein the $Cr_2O_3$ precursor comprises an oxygenated compound of a metal reducible by chromium.

2. The alloy according to claim 1, wherein the dispersed particles occupy from 0.1 to 10% by volume of the alloy.

3. The alloy according to claim 1, wherein the dispersed particles occupy from 1 to 5% by volume of the alloy.

4. The alloy according to claim 1, wherein the oxygenated compound is selected from the group consisting of $Fe_2O_3$, FeO, NiO, and CoO.

5. The alloy according to claim 1, wherein the $Cr_2O_3$ particles are about 1 nm to 10 μm in size.

6. The alloy according to claim 1, wherein the alloy matrix comprises chromium or chromium in combination with at least one other refractory metal selected from the group consisting of molybdenum, tungsten, niobium and tantalum, and mixtures thereof.

7. The alloy according to claim 1, wherein the alloy matrix is a matrix based on molybdenum-chromium, molybdenum-chromium-tungsten or tungsten-chromium.

8. The alloy according to claim 1, wherein the matrix comprises in % by weight:
   from 10 to 60% of Cr
   from 10 to 50% of W
   from 10 to 70% of Mo.

9. The alloy according to claim 1, further comprising 0.1 to 3% by weight of a sintering agent selected from the group consisting of palladium and another platinoid.

10. The alloy according to claim 1, wherein the matrix comprises a combination of chromium and at least one selected from the group consisting of iron, nickel, and cobalt, and mixtures thereof.

11. The alloy according to claim 10, wherein the alloy matrix is a matrix based on nickel-chromium, cobalt-chromium, nickel-cobalt-chromium, nickel-iron-chromium, cobalt-iron-chromium or cobalt-nickel-iron-chromium; and wherein the proportion of the elements in these matrices is in the following ranges in % by weight:

| | |
|---|---|
| Cr | 10 to 40% |
| Ni | 10 to 80% |
| Co | 10 to 80% |
| Fe | 0 to 40%. |

12. The alloy according to claim 1, further comprising, in dispersion within the matrix, at least one oxide selected from the group consisting of yttrium, lanthanum, cerium zirconium, hafnium and thorium oxides.

13. A process for preparing a $Cr_2O_3$-forming alloy, comprising:
    a matrix; and,
    dispersed within said matrix, particles selected from the group consisting of a $Cr_2O_3$ precursor and mixtures $Cr_2O_3$ and a $Cr_2O_3$ precursor; wherein the $Cr_2O_3$ precursor comprises an oxygenated compound of a metal reducible by chromium;
    the process comprising:
        one or more steps of hot consolidation of metallic powders selected from the group consisting of sintering, pressing, forging or welding.

14. The process according to claim 13, further comprising a preliminary step in which the metallic powders are mixed by grinding or mechanical alloying.

15. The process according to claim 13, wherein said metallic powders comprise the matrix metal and particles of $Cr_2O_3$.

16. The process according to claim 13, wherein said metallic powders comprise the matrix metal and particles of a $Cr_2O_3$ precursor.

17. An article, comprising a $Cr_2O_3$-forming alloy, wherein the alloy comprises:
    a matrix; and,
    dispersed within said matrix, particles selected from the group consisting of a $Cr_2O_3$ precursor and mixtures of $Cr_2O_3$, and a $Cr_2O_3$ precursor; wherein the $Cr_2O_3$ precursor comprises an oxygenated compound of a metal reducible by chromium.

18. The article according to claim 17, which is selected from the group consisting of a spinner, a die element, a crucible, a stirring component, an immersed probe or element, a melting electrode, an outlet die or feeder, a furnace part, an electrical heating resistor, a turbine element, a hot fan blade, a heating support, and feed equipment.

19. The alloy according to claim 1, wherein the oxygenated compound is selected from the group consisting of nickel oxides, iron oxides, cobalt oxides, and mixed oxides of chromium with another metal.

20. The alloy according to claim 1, wherein the $Cr_2O_3$ precursor comprises a mixed oxide selected from the group consisting of iron chromite, nickel chromite, and cobalt chromite.

21. The alloy according to claim 1, wherein the dispersed particles occupy at most 10% by volume of the alloy.

22. The process according to claim 13, wherein the $Cr_2O_3$ particles are formed by exposing particles of metallic chromium to an oxidizing atmosphere.

23. A $Cr_2O_3$-forming alloy, comprising:
    a matrix comprising a combination of metallic chromium alloyed with at least one other metal; and
    dispersed within said matrix, particles selected from the group consisting of $Cr_2O_3$, a $Cr_2O_3$ precursor, and mixtures thereof; wherein the particles are distributed uniformly at the grain boundaries of the matrix in the alloy.

24. The alloy according to claim 23, wherein the dispersed particles occupy at most 10% by volume of the alloy.

25. The alloy according to claim 23, wherein the matrix comprises a combination of metallic chromium alloyed with at least one metal selected from the group consisting of molybdenum, tungsten, niobium, tantalum, nickel, iron, cobalt and mixtures thereof.

26. The alloy according to claim 23, wherein the dispersed particles occupy from 1 to 5% by volume of the alloy.

27. The alloy according to claim 23, wherein the $Cr_2O_3$ precursor comprises an oxygenated compound of a metal reducible by chromium.

28. The alloy according to claim 27, wherein the oxygenated compound is selected from the group consisting of nickel oxides, iron oxides, cobalt oxides and the mixed oxides of chromium with another metal.

29. The alloy according to claim 28, wherein the oxygenated compound is selected from the group consisting of $Fe_2O_3$, FeO, NiO, CoO, iron chromite, nickel chromite, and cobalt chromite.

30. The alloy according to claim 23, wherein the $Cr_2O_3$ particles are about 1 nm to 10 $\mu$m in size.

31. The alloy according to claim 23, wherein the alloy matrix comprises chromium or chromium in combination with at least one other refractory metal selected from the group consisting of molybdenum, tungsten, niobium and tantalum, and mixtures thereof.

32. The alloy according to claim 23, wherein the alloy matrix is a matrix based on molybdenum-chromium, molybdenum-chromium-tungsten or tungsten-chromium.

33. The alloy according to claim 23, wherein the matrix comprises in % by weight:
    from 10 to 60% of Cr
    from 10 to 50% of W
    from 10 to 70% of Mo.

34. The alloy according to claim 23, further comprising 0.1 to 3% by weight of a sintering agent selected from the group consisting of palladium and another platinoid.

35. The alloy according to claim 23, wherein the matrix comprises a combination of chromium and at least one selected from the group consisting of iron, nickel, and cobalt, and mixtures thereof.

36. The alloy according to claim 35, wherein the alloy matrix is a matrix based on nickel-chromium, cobalt-chromium, nickel-cobalt-chromium, nickel-iron-chromium, cobalt-iron-chromium or cobalt-nickel-iron-chromium; and wherein the proportion of the elements in these matrices is in the following ranges in % by weight:

| | |
|---|---|
| Cr | 10 to 40% |
| Ni | 10 to 80% |
| Co | 10 to 80% |
| Fe | 0 to 40%. |

37. The alloy according to claim 23, further comprising, in dispersion within the matrix, at least one oxide selected from the group consisting of yttrium, lanthanum, cerium, zirconium, hafnium and thorium oxides.

38. A process for preparing a $Cr_2O_3$-forming alloy, comprising:
 a matrix comprising a combination of metallic chromium alloyed with at least one other metal; and
 dispersed within said matrix, particles selected from the group consisting of $Cr_2O_3$, a $Cr_2O_3$ precursor, and mixtures thereof; wherein the particles are distributed uniformly at the grain boundaries of the matrix in the alloy;
 the process comprising:
  one or more steps of hot consolidation of metallic powders selected from the group consisting of sintering, pressing, forging or welding.

39. The process according to claim 38, further comprising a preliminary step in which the metallic powders are mixed by grinding or mechanical alloying.

40. The process according to claim 38, wherein said metallic powders comprise the metallic chromium, the other metal, and particles of $Cr_2O_3$.

41. The process according to claim 38, wherein the $Cr_2O_3$ particles are formed by exposing particles of metallic chromium to an oxidizing atmosphere.

42. The process according to claim 38, wherein said metallic powders comprise the metallic chromium, the other metal, and particles of a $Cr_2O_3$ precursor.

43. An article, comprising a $Cr_2O_3$-forming alloy, wherein the alloy comprises:
 a matrix comprising a combination of metallic chromium alloyed with at least one other metal; and
 dispersed within said matrix, particles selected from the group consisting of $Cr_2O_3$, a $Cr_2O_3$ precursor, and mixtures thereof; wherein the particles are distributed uniformly at the grain boundaries of the matrix in the alloy.

44. The article according to claim 43, which is selected from the group consisting of a spinner, a die element, a crucible, a stirring component, an immersed probe or element, a melting electrode, an outlet die or feeder, a furnace part, an electrical heating resistor, a turbine element, a hot fan blade, a heating support, and feed equipment.

45. A $Cr_2O_3$-forming alloy, comprising:
 a matrix comprising a combination of metallic chromium alloyed with at least one other metal; and
 dispersed within said matrix, particles selected from the group consisting of $Cr_2O_3$, a $Cr_2O_3$ precursor, and mixtures thereof; wherein the dispersed particles occupy at most 10% by volume of the alloy.

46. The alloy according to claim 45, wherein the matrix comprises a combination of metallic chromium alloyed with at least one metal selected from molybdenum, tungsten, niobium, tantalum, nickel, iron, cobalt and mixtures thereof.

47. The alloy according to claim 45, wherein the dispersed particles occupy from 1 to 5% by volume of the alloy.

48. The alloy according to claim 45, wherein the $Cr_2O_3$ precursor comprises an oxygenated compound of a metal reducible by chromium.

49. The alloy according to claim 48, wherein the oxygenated compound is selected from the group consisting of nickel oxides, iron oxides, cobalt oxides and the mixed oxides of chromium with another metal.

50. The alloy according to claim 49, wherein the oxygenated compound is selected from the group consisting of $Fe_2O_3$, FeO, NiO, CoO, iron chromite, nickel chromite, and cobalt chromite.

51. The alloy according to claim 45, wherein the $Cr_2O_3$ particles are about 1 nm to 10 μm in size.

52. The alloy according to claim 45, wherein the alloy matrix comprises chromium or chromium in combination with at least one other refractory metal selected from the group consisting of molybdenum, tungsten, niobium and tantalum, and mixtures thereof.

53. The alloy according to claim 45, wherein the alloy matrix is a matrix based on molybdenum-chromium, molybdenum-chromium-tungsten or tungsten-chromium.

54. The alloy according to claim 45, wherein the matrix comprises in % by weight:
 from 10 to 60% of Cr
 from 10 to 50% of W
 from 10 to 70% of Mo.

55. The alloy according to claim 45, further comprising 0.1 to 3% by weight of a sintering agent selected from the group consisting of palladium and another platinoid.

56. The alloy according to claim 45, wherein the matrix comprises a combination of chromium and at least one selected from the group consisting of iron, nickel, and cobalt, and mixtures thereof.

57. The alloy according to claim 56, wherein the alloy matrix is a matrix based on nickel-chromium, cobalt-chromium, nickel-cobalt-chromium, nickel-iron-chromium, cobalt-iron-chromium or cobalt-nickel-iron-chromium; and wherein the proportion of the elements in these matrices is in the following ranges in % by weight:

| | |
|---|---|
| Cr | 10 to 40% |
| Ni | 10 to 80% |
| Co | 10 to 80% |
| Fe | 0 to 40%. |

58. The alloy according to claim 45, further comprising, in dispersion within the matrix, at least one oxide selected from the group consisting of yttrium, lanthanum, cerium, zirconium, hafnium and thorium oxides.

59. A process for preparing a $Cr_2O_3$-forming alloy, comprising:
 a matrix comprising a combination of metallic chromium alloyed with at least one other metal; and
 dispersed within said matrix, particles selected from the group consisting of $Cr_2O_3$, a $Cr_2O_3$ precursor, and mixtures thereof; wherein the dispersed particles occupy at most 10% by volume of the alloy
 the process comprising:
  one or more steps of hot consolidation of metallic powders selected from the group consisting of sintering, pressing, forging or welding.

60. The process according to claim 59, further comprising a preliminary step in which the metallic powders are mixed by grinding or mechanical alloying.

61. The process according to claim 59, wherein said metallic powders comprise the metallic chromium, the other metal, and particles of $Cr_2O_3$.

62. The process according to claim 59, wherein the $Cr_2O_3$ particles are formed by exposing particles of metallic chromium to an oxidizing atmosphere.

63. The process according to claim 59, wherein said metallic powders comprise the matrix metal and particles of a $Cr_2O_3$ precursor.

64. An article, comprising:
 a matrix comprising a combination of metallic chromium alloyed with at least one other metal; and
 dispersed within said matrix, particles selected from the group consisting of $Cr_2O_3$, a $Cr_2O_3$ precursor, and mixtures thereof; wherein the dispersed particles occupy at most 10% by volume of the alloy.

65. The article according to claim 64, which is selected from the group consisting of a spinner, a die element, a crucible, a stirring component, an immersed probe or element, a melting electrode, an outlet die or feeder, a furnace part, an electrical heating resistor, a turbine element, a hot fan blade, a heating support, and feed equipment.

* * * * *